A. NEWHOPE.
ATTACHMENT FOR MOTOR VEHICLES.
APPLICATION FILED FEB. 15, 1919.
1,329,200.
Patented Jan. 27, 1920.
2 SHEETS—SHEET 1.
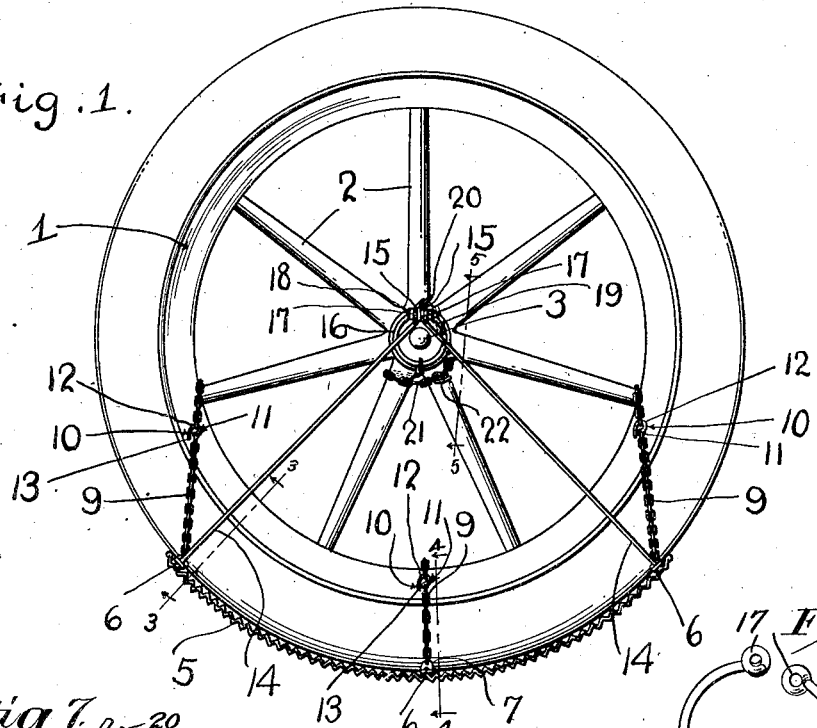
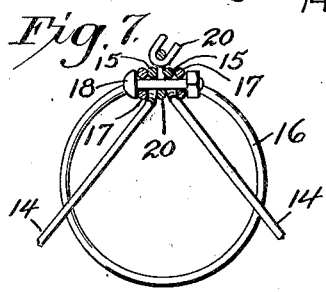
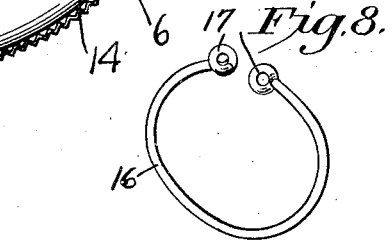
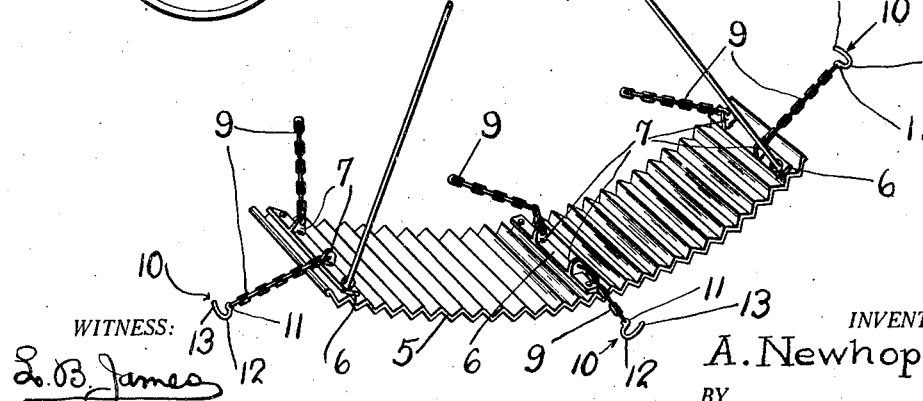
WITNESS:
L. B. James
INVENTOR.
A. Newhope
BY
Victor J. Evans ATTORNEY.

A. NEWHOPE.
ATTACHMENT FOR MOTOR VEHICLES.
APPLICATION FILED FEB. 15, 1919.
1,329,200.
Patented Jan. 27, 1920.
2 SHEETS—SHEET 2.
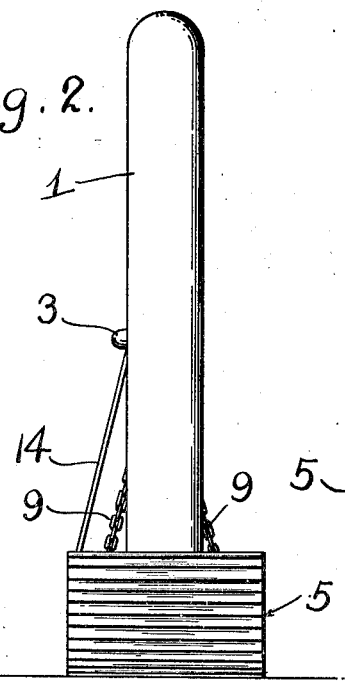
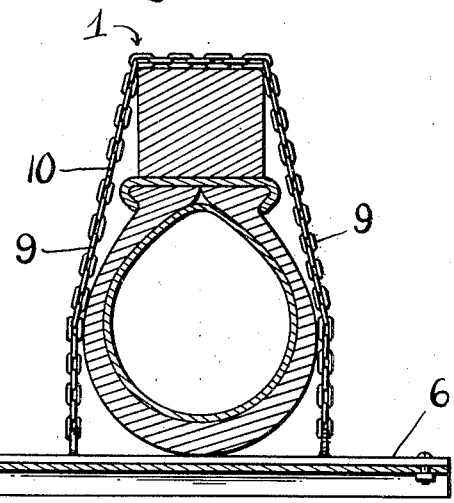
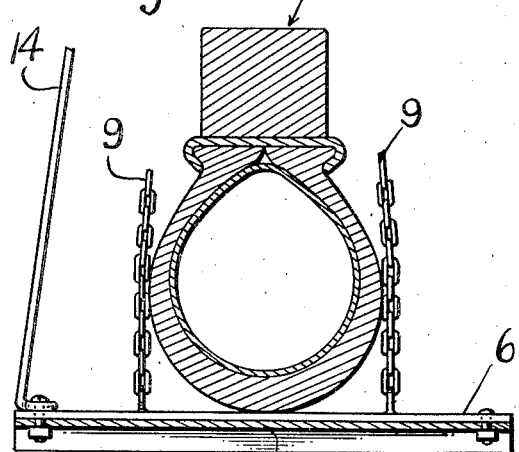
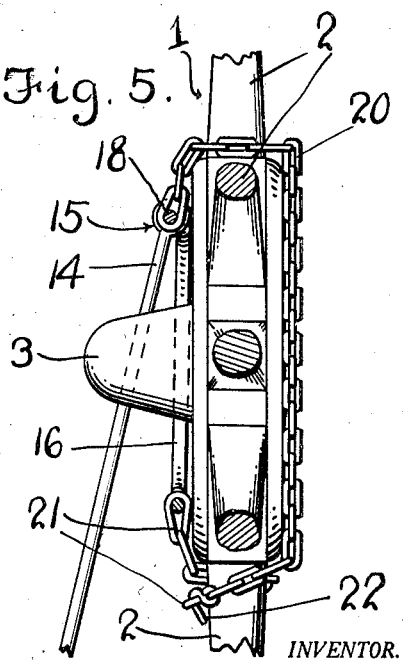
WITNESS:
L. B. James
INVENTOR.
A. Newhope
BY
Victor J. Evans ATTORNEY.

UNITED STATES PATENT OFFICE.

ALFRED NEWHOPE, OF JACKSONVILLE, FLORIDA.

ATTACHMENT FOR MOTOR-VEHICLES.

1,329,200.   Specification of Letters Patent.   Patented Jan. 27, 1920.

Application filed February 15, 1919.   Serial No. 277,188.

*To all whom it may concern:*

Be it known that I, ALFRED NEWHOPE, a citizen of Sweden, residing at Jacksonville, in the county of Duval and State of Florida, have invented new and useful Improvements in Attachments for Motor-Vehicles, of which the following is a specification.

This invention has reference to means for increasing the traction surface for a wheel in traveling over sand, mud, snow and soft surfaces without allowing the wheel to sink in such surfaces, as well as for facilitating the extraction of wheels from ruts in a road.

An object of the invention is to produce a traction surface or extricator for vehicle wheels comprising a ribbed or corrugated member of a greater width than the wheel tire or tread surface, and which may be easily and quickly attached to the wheel or removed therefrom as desired.

It is a further object of the invention to produce a means for increasing the traction surface for a wheel comprising a ribbed or corrugated plate having means whereby the same is not only attached around the rim of the wheel but is supported from the hub thereof.

It is a still further object of the invention to produce a means for increasing the traction surface of a wheel which may comprise a straight flexible plate designed to be readily shaped to correspond with the contour of the tire of the wheel upon which the same is arranged, having means for retaining the same in such condition and for properly supporting the same on the wheel, the said device, when not in use, being applied as stated so that one or a number thereof may be arranged in the box below the seat of the vehicle when not required for use, or may be otherwise stored in the vehicle and occupy but a small space.

Other objects and advantages will appear as the nature of the invention is better understood, reference being had to the accompanying drawings, in which:

Figure 1 is a side elevation of a wheel provided with the improvement.

Fig. 2 is an edge view thereof.

Fig. 3 is a sectional view approximately on the line 3—3 of Fig. 1.

Fig. 4 is a sectional view approximately on the line 4—4 of Fig. 1.

Fig. 5 is a sectional view approximately on the line 5—5 of Fig. 1.

Fig. 6 is a perspective view of the improvement detached from the wheel.

Fig. 7 is a sectional view showing the bolt member passing through alining eyes in the rod and rib.

Fig. 8 is a view of the split ring which engages with the hub.

Referring now to the drawings in detail, the numeral 1 designates an ordinary vehicle wheel, the spokes 2 of which radiating in the usual manner from the hub 3.

My improved traction surface increasing device is preferably constructed from a plate of flexible material, and is, as disclosed by the drawings, transversely corrugated providing V-shaped projections and V-shaped depressions between the said projections. The projections provide what may be termed calks, or resisting surfaces for the road bed over which the wheel travels.

The plate 5 is of a materially greater width than that of the tread surface or tire of the wheel, and when in position the said tread surface of the wheel is designed to be arranged centrally of the plate, so that the said plate projects a considerable distance beyond each side of the wheel. The plate, at the ends thereof, and approximately at the central portion thereof may be reinforced by bars 6 secured transversely thereto, that is, upon the inner surface of the said plate. The plate, on its inner surface at its said ends and its center is provided with spaced lugs 7 arranged in pairs, the space between the lugs being sufficient to receive therein the tread surface or tire of the wheel. These lugs 7 have secured thereto flexible elements preferably in the nature of chains 9, one of each pair of chains having its end link provided with pivoted hooks 10 designed to engage certain of the links of the co-acting chain. The central chains are shorter than the end chains, and the end chains are designed to be arranged around the spokes of the wheel nearest the ends of the extricator and to be clamped thereon by the engagement of the hooks with the chain sections, as will be understood. The hooks are each preferably constructed of a wire member having an eye portion 11 which is secured to the end links of each of the series of chains. The hooks are rounded upon themselves from the said eye portion, as indicated by the numeral 12, and from this rounded portion are provided with elongated extensions in the nature of beaks 13. The links engaged by the hooks are designed to be received in the referred to rounded portions 12 of the hooks proper.

As stated, the plate is constructed of resilient material so that the same will readily lend itself to the contour of the wheel and also, when the same is not in use the plate may be brought to a flat condition so that the device may be readily stored in the vehicle. Any number of the extricators or traction surface increasing members may be employed on the wheel.

In addition to the chain connection between the extricator or traction surface increaser and the wheel, I have arranged adjacent the ends thereof the improved pivoted rods 14 directed angularly toward each other and having the inner ends thereof provided with eyes 15. On the hub of the wheel is a split ring clamp 16, the ends of which are provided with eyes 17 disposed outwardly but in a line with the eyes of the rods. Through the alining eyes of the rods and the ring is passed a bolt member 18, the said bolt being engaged by a nut 19. In addition to this, I secure upon the ring clamping member chain sections 20 and 21 respectively, one of the said chain sections having a hook 22, similar to the hooks previously described. These chain sections are designed to be arranged around the spokes at their connection with the hub of the wheel, and the hook is adapted to connect the chain sections in a manner as will be readily understood.

The outside rigid supports are for the purpose of serving as auxiliary spokes to support the surface of the plate that is disposed outward of the wheel of the vehicle, so that the weight of the load of the vehicle will be delivered to all parts of the said plate. Also by this arrangement the width of the plate to the outside of the wheel may be practically unlimited.

Having thus described the invention, what is claimed as new, is:—

1. A traction surface increasing means for vehicle wheels, comprising a member of greater width than the tire of a wheel designed to be arranged on the outer surface of the tire, flexible means for securing the member to the rim of the wheel, and rigid supporting means between said member and the hub of the wheel.

2. A traction surface increasing means for vehicle wheels, comprising a normally flat yieldable member of a less length than the circumference of a wheel and of a width greater than that of the tire of the wheel, said member designed to be arranged on the outer surface of the tire to conform to the shape of the said tire, flexible means for securing the member to the rim of the wheel, and rigid supporting means between said member and the hub of the wheel.

In testimony whereof I affix my signature.

ALFRED NEWHOPE.